(12) United States Patent
Groves et al.

(10) Patent No.: US 7,438,164 B2
(45) Date of Patent: Oct. 21, 2008

(54) SOLENOID ACTUATED CONTINUOUSLY VARIABLE SERVO VALVE FOR ADJUSTING DAMPING IN SHOCK ABSORBERS AND STRUTS

(75) Inventors: Gary W Groves, Toledo, OH (US); Karl Kazmirski, Toledo, OH (US); David L Steed, Perrysburg, OH (US); Michael L Zebolsky, Marshall, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 128 days.

(21) Appl. No.: 10/730,560

(22) Filed: Dec. 8, 2003

(65) Prior Publication Data

US 2005/0121268 A1 Jun. 9, 2005

(51) Int. Cl.
*F16F 9/00* (2006.01)
*F16F 9/48* (2006.01)

(52) U.S. Cl. .................. 188/315; 188/281; 188/322.14; 188/318; 188/322.2

(58) Field of Classification Search .............. 188/266.1, 188/266.2, 266.6, 281, 286, 287, 297, 313, 188/314, 315, 316, 317, 318, 319.1, 322.13, 188/282.4, 322.14, 322.2
See application file for complete search history.

(56) References Cited

U.S. PATENT DOCUMENTS

| | | | |
|---|---|---|---|
| 3,638,885 A | 2/1972 | Reed | |
| 3,757,910 A | 9/1973 | Palmer | |
| 3,823,600 A | 7/1974 | Wolff | |
| 4,084,668 A | 4/1978 | Rybicki | 188/312 |
| 4,113,072 A | 9/1978 | Palmer | |
| 4,266,639 A * | 5/1981 | Schloth | 188/313 |
| 4,743,000 A | 5/1988 | Karnopp | 267/218 |
| 4,743,046 A | 5/1988 | Schnittger | 280/5.519 |
| 4,802,561 A | 2/1989 | Knecht et al. | 188/318 |
| 4,826,207 A | 5/1989 | Yoshioka et al. | |
| 4,854,429 A | 8/1989 | Casey | |
| 4,890,858 A | 1/1990 | Blankenship | |
| 4,923,038 A | 5/1990 | Lizell | |
| 4,958,705 A | 9/1990 | Horvath | 188/314 |
| 4,986,393 A | 1/1991 | Preukschat et al. | 188/266.6 |
| 5,025,899 A | 6/1991 | Lizell | |
| 5,078,240 A | 1/1992 | Ackermann et al. | |
| 5,143,186 A | 9/1992 | Lizell | |
| 5,163,706 A | 11/1992 | Maguran | |
| 5,201,389 A | 4/1993 | Miller | |
| 5,217,095 A | 6/1993 | Lizell | |
| 5,231,583 A | 7/1993 | Lizell | 701/37 |
| 5,285,878 A | 2/1994 | Scheffel et al. | |
| 5,295,563 A | 3/1994 | Bennett | |
| 5,472,070 A | 12/1995 | Feigel | |
| 5,509,512 A | 4/1996 | Grundei | |

(Continued)

*Primary Examiner*—Melody M Burch
(74) *Attorney, Agent, or Firm*—Harness, Dickey & Pierce, PLC

(57) ABSTRACT

A shock absorber includes a pressure tube with a piston slidably disposed therein. A separate valve includes a fluid circuit for fluid low in rebound and a fluid circuit for fluid flow in compression. Each fluid circuit includes a variable orifice which allows selection between a firm rebound with a soft compression, a soft rebound with a soft compression and a soft rebound with a firm compression. Each variable orifice is in communication with a blowoff valve in such a manner that they provide a variable blowoff feature to the blowoff valves.

20 Claims, 4 Drawing Sheets

U.S. PATENT DOCUMENTS

| | | |
|---|---|---|
| 5,586,627 A | 12/1996 | Nezu et al. |
| 5,588,510 A | 12/1996 | Wilke ...................... 188/266.6 |
| 5,655,633 A | 8/1997 | Nakadate et al. |
| 5,775,470 A | 7/1998 | Feigel |
| 5,833,036 A | 11/1998 | Gillespie |
| 5,901,820 A | 5/1999 | Kashiwagi et al. |
| 5,934,421 A * | 8/1999 | Nakadate et al. ......... 188/299.1 |
| 5,934,422 A * | 8/1999 | Steed ........................ 188/318 |
| 5,944,153 A | 8/1999 | Ichimaru .................. 188/299.1 |
| 5,968,102 A | 10/1999 | Ichimaru et al. ............... 701/37 |
| 5,996,748 A | 12/1999 | Nezu et al. ................... 188/813 |
| 6,120,009 A | 9/2000 | Gatehouse et al. ........ 267/64.11 |
| 6,129,368 A | 10/2000 | Ishikawa ............. 280/124.112 |
| 6,182,805 B1 * | 2/2001 | Kashiwagi et al. ........ 188/266.6 |
| 6,427,986 B1 * | 8/2002 | Sakai et al. ............... 267/64.15 |
| 6,464,048 B1 * | 10/2002 | Groves et al. ............ 188/266.6 |

\* cited by examiner

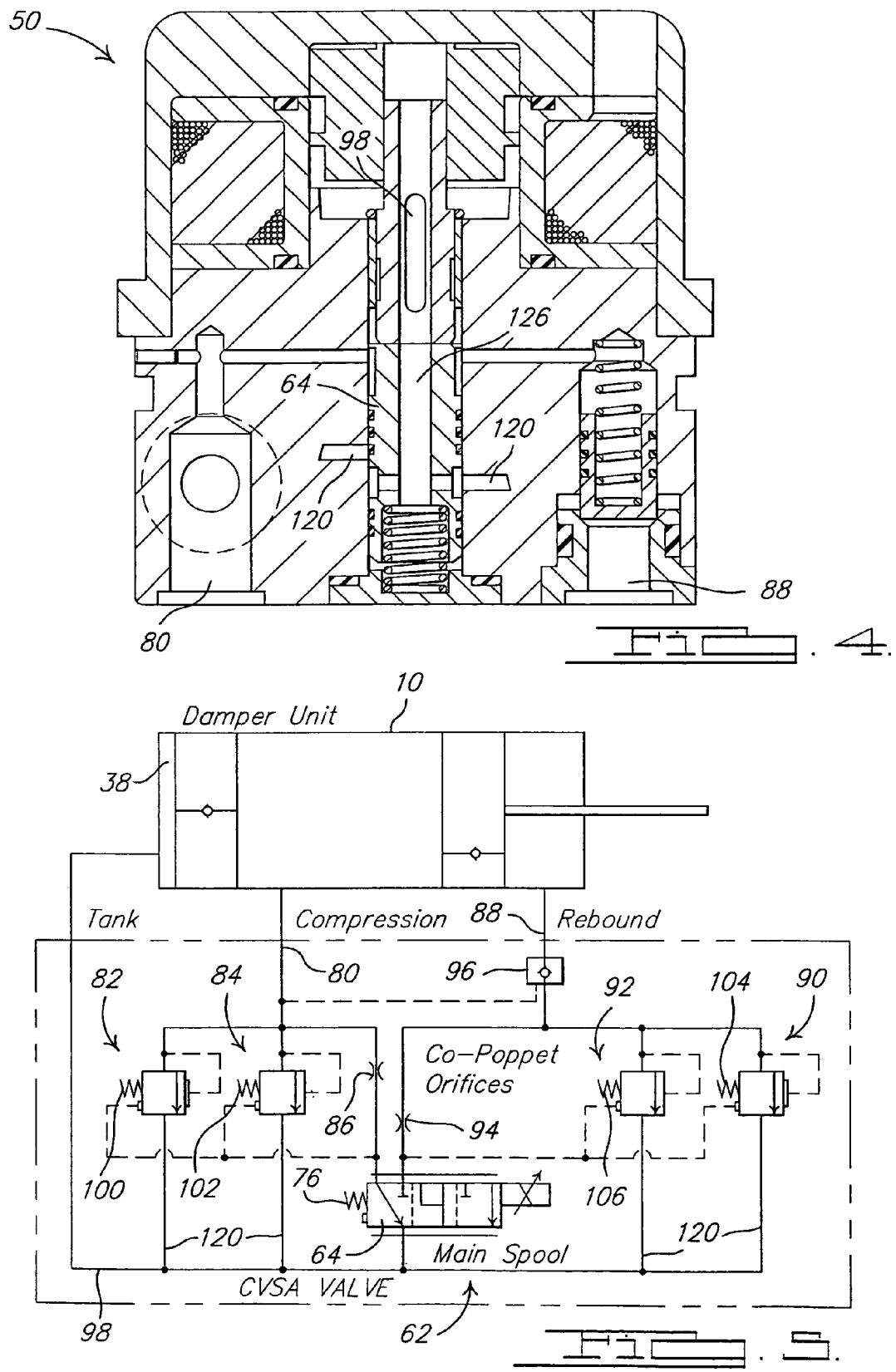

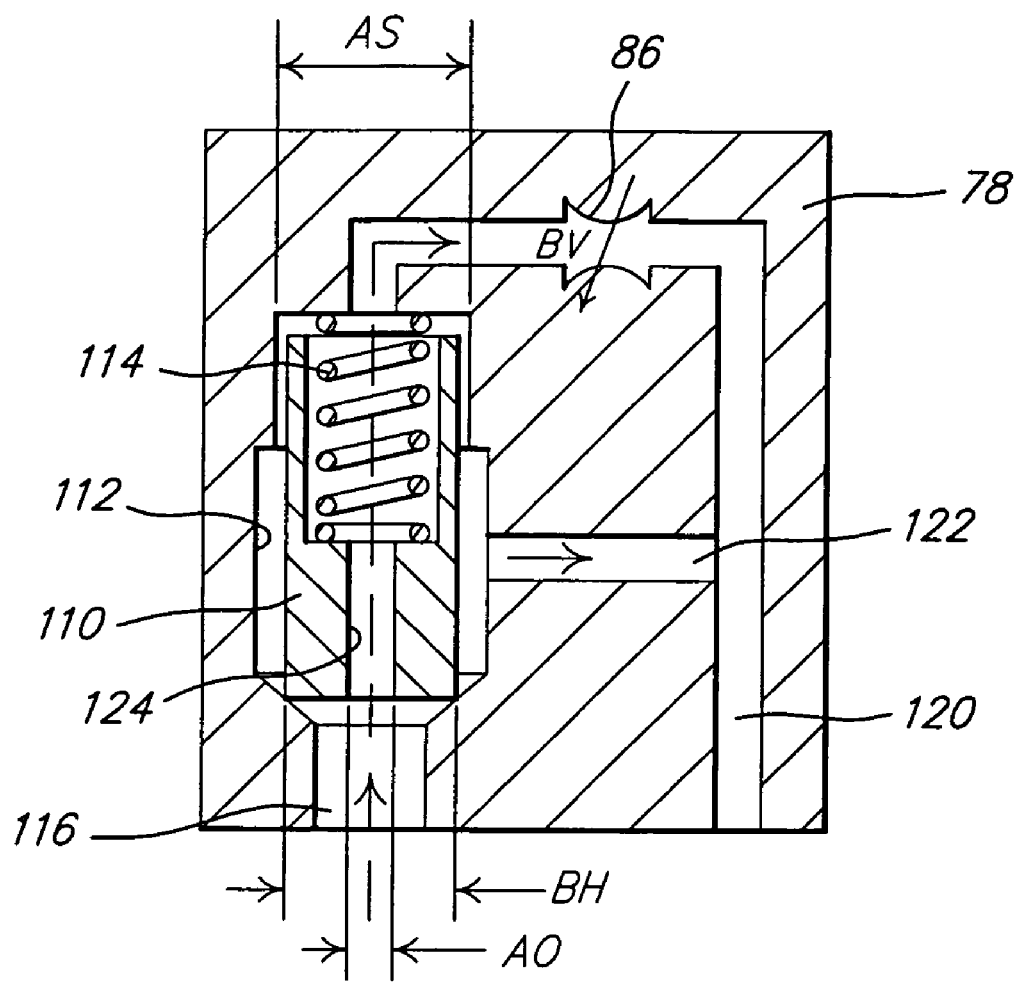
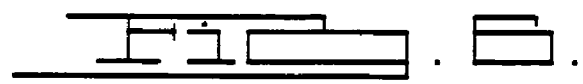

SOLENOID ACTUATED CONTINUOUSLY VARIABLE SERVO VALVE FOR ADJUSTING DAMPING IN SHOCK ABSORBERS AND STRUTS

FIELD OF THE INVENTION

The present invention relates to a hydraulic damper or shock absorber adapted for use in a suspension system such as the suspension systems used for automotive vehicles. More particularly, the present invention relates to a hydraulic damper or shock absorber having a continuously variable damping characteristic which is adjustable by a solenoid actuated continuously variable servo valve to vary the damping characteristics between a relatively low level of damping for a soft ride for comfort and a relatively high level of damping for a firm ride for handling.

BACKGROUND OF THE INVENTION

A conventional prior art hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system is incorporated within the piston as a safety hydraulic relief valve during the shock absorber's extension stroke of the piston with respect to the cylinder and a second valving system is incorporated within the piston for allowing fluid replenishment above the piston during the shock absorber's compression stroke of the piston with respect to the cylinder.

Various types of adjustment mechanisms have been developed to generate variable damping forces in relation to the speed and/or the amplitude of the displacement of the sprung mass in relation to the unsprung mass. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the sprung mass from these small vibrations. During a turning or braking maneuver, as an example, the sprung mass of the vehicle will attempt to undergo a relatively slow and/or large movement or vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small amplitude excitations of the unsprung mass while still providing the necessary damping or firm ride for the suspension system during vehicle maneuvers causing low frequency/large excitations of the sprung mass.

The continued development of shock absorbers includes the development of adjustment systems which provide the vehicle designer with a continuously variable system which can be specifically tailored to a vehicle to provide a specified amount of damping in relation to various monitored conditions of the vehicle and its suspension system.

SUMMARY OF THE INVENTION

The present invention provides the art with a continuously variable adjustable hydraulic damper or shock absorber that includes the capability of adjusting the damping rate of the shock absorber between a firm rebound damping force with a soft compression damping force, a soft rebound force with a soft compression damping force and a soft rebound damping force with a firm compression damping force. A solenoid actuated continuously variable servo valve adjusts the damping force characteristics of the shock absorber and has the capability of positioning the damping force characteristics of the shock absorber anywhere between these configurations to provide the continuously variable damping for the shock absorber.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 4 is a cross-sectional side view illustrating the servo valve shown in FIG. 1 when the shock absorber is configured to provide a soft ride during rebound and a firm ride during compression of the shock absorber;

FIG. 5 is a schematic view illustrating the hydraulic fluid circuit incorporated into the shock absorber shown in FIG. 1; and FIG. 6 is a cross-sectional side view illustrating a typical poppet valve in accordance with the present invention.

DETAILED DESCRIPTION OF THE PREFERRED EMBODIMENT

Figure 1:
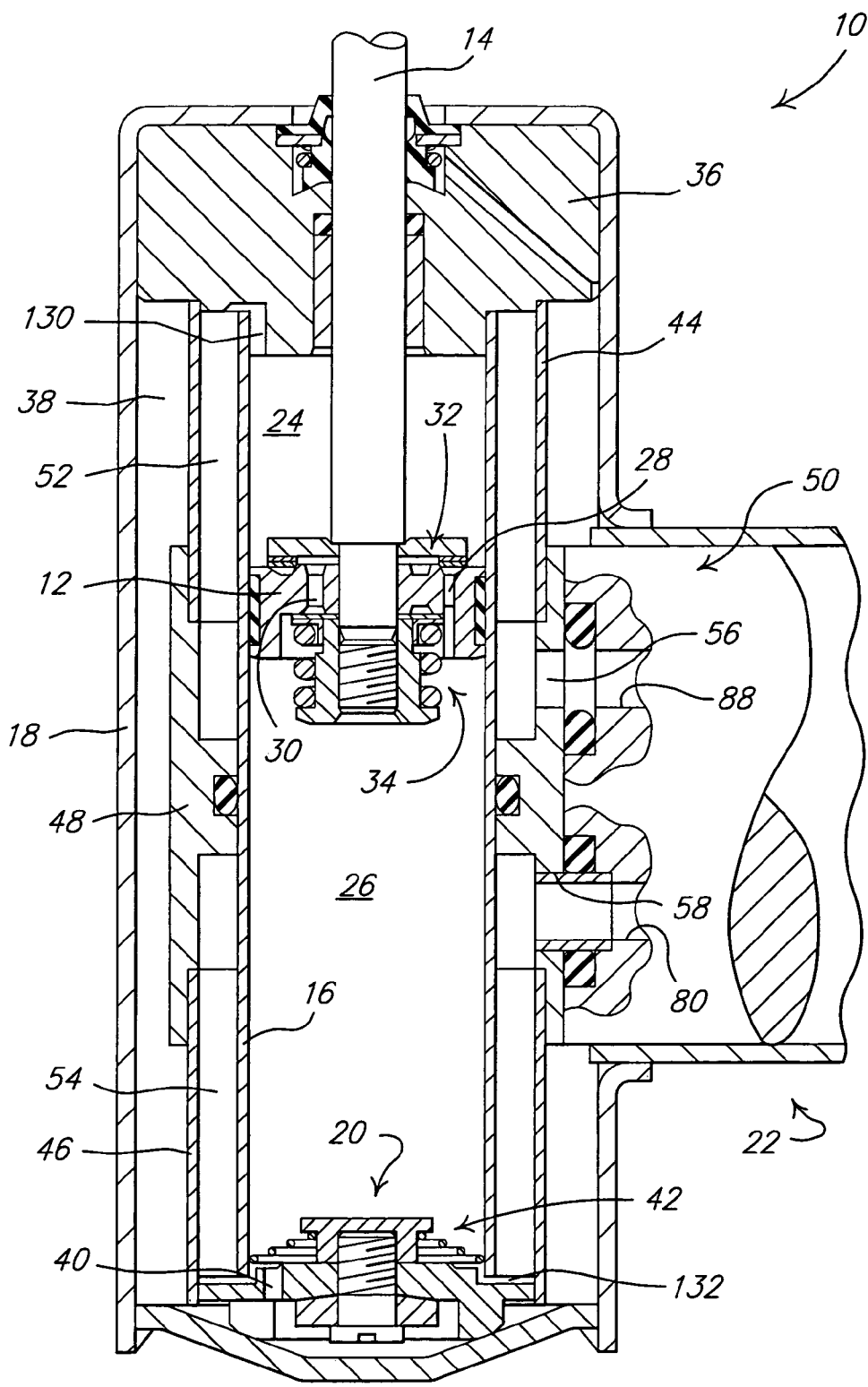
FIG. 1 is a cross-sectional side view of a shock absorber incorporating the continuously variable damping capabilities utilizing piston rod displacement damping fluid in accordance with the present invention.

Referring now to the drawings in which like reference numerals designate like or corresponding parts throughout the several views, there is shown in FIG. 1 a shock absorber incorporating the continuously variable damping adjustment system in accordance with the present invention which is designated generally by the reference numeral 10. Shock absorber 10 is a dual tube shock absorber which comprises a piston 12, a piston rod 14, a pressure tube 16, a reserve tube 18, a base valve assembly 20 and a continuously variable servo valve assembly 22. Piston 12 is slidably received within pressure tube 16 and divides pressure tube 16 into an upper working chamber 24 and a lower working chamber 26. Piston 12 defines a plurality of compression passages 28 and a plurality of rebound passages 30, each of which extends between upper and lower working chambers 24 and 26. A compression check valve 32 allows fluid flow from lower working chamber 26 through passages 28 to upper working chamber 24 during a compression stroke of shock absorber 10, but prohibits fluid flow from upper working chamber 24 to lower working chamber 26 during a rebound stroke of shock absorber 10. A rebound check valve 34 allows fluid flow from upper working chamber 24 through passages 30 to lower working chamber 26 during a rebound stroke of shock absorber 10 but prohibits fluid flow from lower working chamber 26 to upper working chamber 24 during a compression stroke of shock absorber 10. Compression check valve 32 and rebound check valve 34 do not determine the damping force characteristics for shock absorber 10. Compression check valve 32 is for the replenishment of damping fluid only and rebound check valve 34 is set for a damping force higher than the highest damping force required and is for preventing complete hydraulic lockup of shock absorber 10 in case of failure of continuously variable servo valve assembly 22.

Piston rod 14 is attached to piston 12 and extends out of pressure tube 16 and reserve tube 18 through a rod guide 36. The outer end of piston rod 14 is adapted to be attached to the sprung mass of the vehicle by means known well in the art. Reserve tube 18 surrounds pressure tube 16 and with pressure tube 16 defines a reserve chamber 38. Reserve tube 18 is adapted for attachment to the unsprung mass of the vehicle by methods known well in the art. Base valve assembly 20 is disposed between lower working chamber 26 and reserve chamber 38 and it defines a plurality of passages 40 for permitting fluid flow between these chambers. A one-way check valve 42 allows fluid flow from reserve chamber 38 to lower working chamber 26 through passages 40 but prohibits fluid flow from lower working chamber 26 to reserve chamber 38. Continuously variable servo valve assembly 22 extends into reserve chamber 38 through reserve tube 18 and operates to control the flow of fluid within shock absorber 10 and thus the damping characteristics of shock absorber 10. Continuously variable servo valve assembly 22 has the capability to continuously vary the damping characteristics of shock absorber 10.

Continuously variable servo valve assembly 22 comprises an upper intermediate tube 44, a lower intermediate tube 46, a valve interface 48 and a solenoid valve assembly 50. Upper intermediate tube 44 is disposed within the upper portion of reserve chamber 38 and sealingly engages rod guide 36. Lower intermediate tube 46 is disposed within the lower portion of reserve chamber 38 and sealingly engages base valve assembly 20. Valve interface 48 is disposed within reserve chamber 38 and sealingly engages upper intermediate tube 44, lower intermediate tube 46 and pressure tube 16. Pressure tube 16, rod guide 36, upper intermediate tube 44 and valve interface 48 define an upper intermediate chamber 52 disposed between reserve chamber 38 and working chambers 24 and 26. Pressure tube 16, base valve assembly 20, lower intermediate tube 46 and valve interface 48 define a lower intermediate chamber 54 disposed between reserve chamber 38 and working chambers 24 and 26. Valve interface 48 defines a rebound outlet 56 in communication with upper intermediate chamber 52 and a compression outlet 58 in communication with lower intermediate chamber 54.

Figure 2:
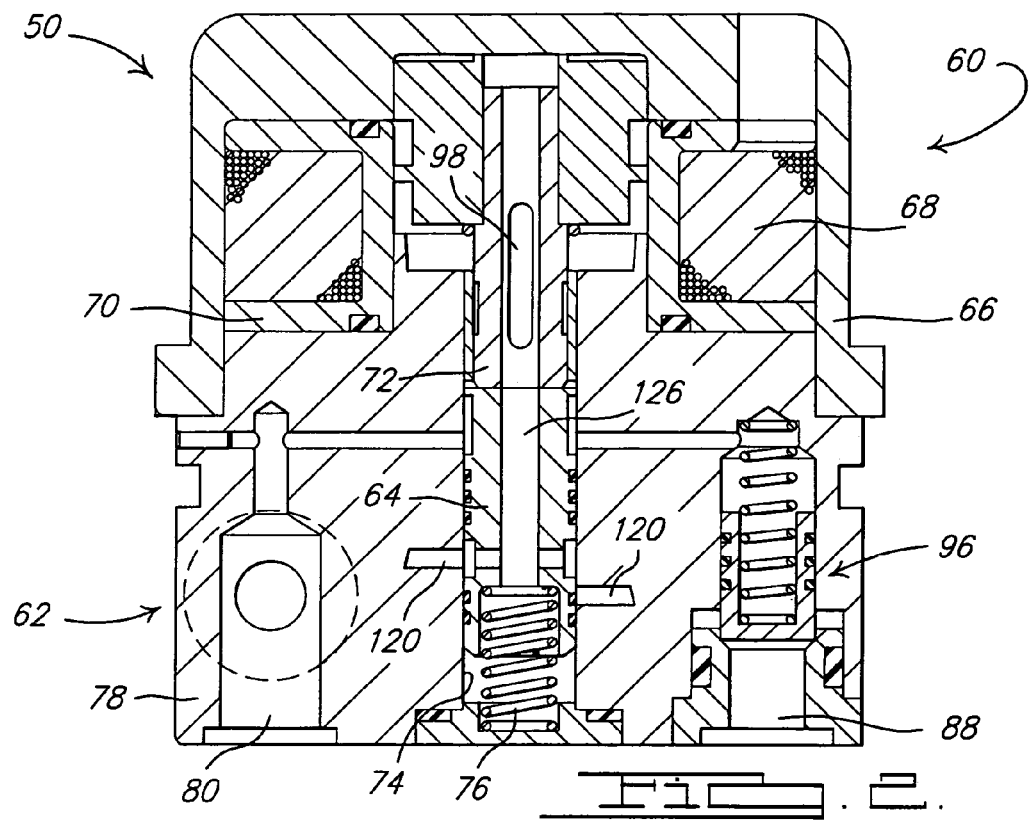
FIG. 2 is a schematic side view illustrating the servo valve shown in FIG. 1 when the shock absorber is configured to provide a firm ride during rebound and a soft ride during compression of the shock absorber.

Referring now to FIGS. 1 and 2, solenoid valve assembly 50 sealingly engages valve interface 48 and is sealingly secured to reserve tube 18. Solenoid valve assembly 50 comprises a solenoid coil assembly 60, a solenoid valve body assembly 62 and a spool valve 64. Solenoid valve assembly 60 includes a housing 66 within which is contained a set of windings 68 and a coil bobbin 70. A valve member 72 is disposed within the set of windings 68 and moves axially within the windings 68 in response to electrical power being supplied to windings 68 as is well known in the art. Solenoid coil assembly 60 is attached to solenoid valve body assembly 62. Spool valve 64 is disposed within a bore 74 extending through main valve assembly 62. A spring 76 biases spool valve 64 towards solenoid valve assembly 60. Thus, solenoid coil assembly 60 operates to move spool valve 64 axially within bore 74 of solenoid valve body assembly 62. Spool valve 64 is normally in an upper position as shown in FIG. 2 and is movable to a lower position as shown in FIG. 4 when full power is being supplied to solenoid coil assembly 60. By the use of pulse width modulation, the position of spool valve 64 can be intermediate the positions shown in FIGS. 2 and 4 which is the position shown in FIG. 3.

Referring now to FIGS. 2 and 5, solenoid valve body assembly 62 comprises a valve body 78, a compression inlet 80, a compression main poppet 82, a compression co-poppet 84, a compression orifice 86, a rebound inlet 88, a rebound main poppet 90, a rebound co-poppet 92 and a rebound orifice 94. A shuttle valve 96 is disposed between compression inlet 80 and rebound inlet 88. Shuttle valve 96 permits flow from rebound inlet 88 to compression inlet 80 during the rebound stroke of shock absorber 10, but prohibits fluid flow from compression inlet 80 to rebound inlet 88 during the compression stroke of shock absorber 10. Because during the compression stroke of shock absorber 10, the pressure generated in lower working chamber 26 is greater than the pressure in upper working chamber 24, shuttle valve 96 closes rebound inlet 88 thus forcing the damping fluid being displaced by piston rod 14 through compression check valve 32 on piston 12 into lower working chamber 26 through fluid flow passage 132 of base valve assembly 20 into lower intermediate chamber 54 thereby into compression outlet 58. Solenoid valve body assembly 62 is positioned such that valve body 78 sealingly engages valve interface 48 with compression inlet 80 sealingly engaging compression outlet 58 and with rebound inlet 88 sealingly engaging rebound outlet 56. A fluid passageway 98 extends between and fluidly connects bore 74 and reserve chamber 38.

Referring now to FIG. 5, a fluid schematic diagram is shown. Fluid flow through compression inlet 80 is directed to compression main poppet 82, compression co-poppet 84 and compression orifice 86. Fluid flow through compression main poppet 82 and compression co-poppet 84 is directed back to reserve chamber 38. Fluid flow through compression orifice 86 is directed through spool valve 64 and then returned to reserve chamber 38. Compression main poppet 82 is urged into a closed position by a biasing member 100 and the fluid pressure present at a position between compression orifice 84 and spool valve 64. Fluid pressure from compression inlet 80 urges compression main poppet 82 towards an open position. In a similar manner, compression co-poppet 84 is urged into a closed position by a biasing member 102 and the fluid pressure present at a position between compression orifice 86 and spool valve 64. Fluid pressure from compression inlet 80 also urges compression co-poppet 84 toward an open position. Thus by controlling the amount of fluid allowed to pass from compression inlet 80 to reserve chamber 38 through compression orifice 86, the fluid pressure urging compression main poppet 82 and compression co-poppet 84 towards the open position can be controlled. Fluid flow through rebound inlet 88 is directed to rebound main poppet 90, rebound co-poppet 92 and rebound orifice 94. Fluid flow through rebound main poppet 90 and rebound co-poppet 92 is directed back to reserve chamber 38. Fluid flow from rebound orifice 94 is directed through spool valve 64 and then returned to reserve chamber 38. Rebound main poppet 90 is urged into a closed position by a biasing member 104 and the fluid pressure present at a position between rebound orifice 94 and spool valve 64. Fluid pressure from rebound inlet 88 urges rebound main poppet 90 towards an open position. In a similar manner, rebound co-poppet 92 is urged into a closed position by a biasing member 106 and the fluid pressure present at a position between rebound orifice 94 and spool valve 64. Fluid pressure from rebound inlet 88 also urges rebound co-poppet 94 into an open position. Thus by controlling the amount of fluid allowed to pass from rebound inlet 88 to reserve chamber 38 through rebound orifice 94, the fluid pressure urging rebound main poppet 90 and rebound co-poppet 92 towards the open position can be controlled.

During the operation of shock absorber 10, there is no damping force characteristic in either rebound or compression that is determined by check valves 32 and 34 in piston 12. Check valve 32 in piston 12 is for replenishment of hydraulic fluid only. Check valve 34 in piston 12 is set to provide a damping force higher than the highest damping force required and is for preventing hydraulic lockup upon failure of continuously variable servo valve assembly 22. Continuously variable servo valve assembly 22 determines the damping force characteristics for shock absorber 10. The damping force characteristics for shock absorber 10 are controllable by continuously variable servo valve assembly 22 such that in any given complete stroke of shock absorber 10 (rebound to compression to rebound) depending on the amount of current given to energize solenoid coil assembly 60. When little or no current is supplied to solenoid coil assembly 60, continuously variable servo valve assembly 22 generates a firm rebound damping force with a soft compression damping force for shock absorber 10. When full current to solenoid coil assembly 60 is supplied, continuously variable servo valve assembly 22 generates a soft rebound damping force with a firm compression damping force for shock absorber 10.

Another characteristic of continuously variable servo valve assembly 22 is that when a continuously variable energy signal (through pulse width modulation) is provided to solenoid coil assembly 60, a continuously variable sloping bleed and a continuously variable level blowoff for poppets 82, 84, 90 and 92 are provided. The basis for this characteristic is shown in FIGS. 5 and 6.

FIG. 6 discloses schematically compression main poppet 82. While FIG. 6 is directed to compression main poppet 82, it is to be understood that compression co-poppet 84, rebound main poppet 90 and rebound co-poppet 92 operate in a similar manner to main poppet 82. Compression main poppet 82 includes a valve member 110 disposed within a bore 112 in valve body 78 of solenoid valve body assembly 62. A spring 114 urges valve member 110 into a closed position as shown in FIG. 6. Fluid flow from compression inlet 80 is directed to a fluid inlet 116, through an internal bore 124 in valve member 110, and then to compression orifice 86. From compression orifice 86, fluid flows back to reserve chamber 38 through a passage 120. A blowoff passage 122 extends from bore 112 to passage 120 to allow fluid flow when valve member 110 is moved to an open position.

Figure 3:
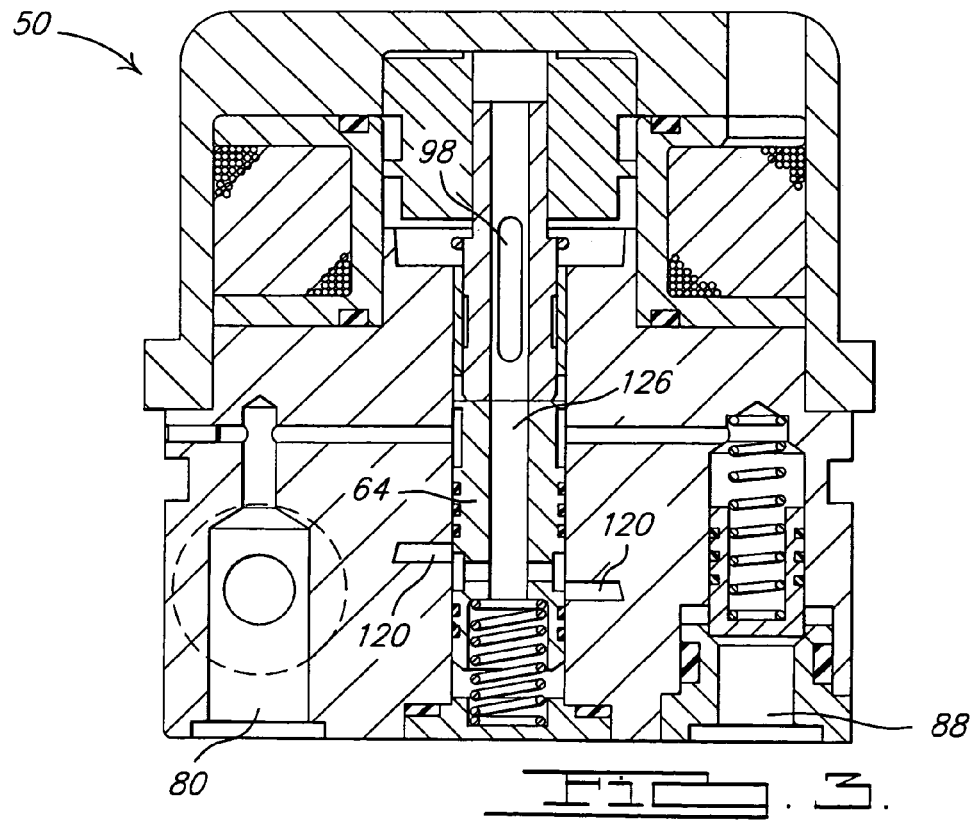
FIG. 3 is a cross-sectional side view illustrating the servo valve shown in FIG. 1 when the shock absorber is configured to provide a soft ride during rebound and a soft ride during compression of the shock absorber.

The amount of fluid flow allowed through compression orifice 86 and rebound orifice 94 will be determined by the position of spool valve 64 as shown in FIGS. 2-4. In FIGS. 2-4, passage 120 adjacent rebound inlet 88 returns fluid from passage 120 of rebound poppets 90 and 92 as well as from rebound orifice 94. Passage 120 shown adjacent compression inlet 80 returns fluid from passage 120 of compression poppets 82 and 84 as well as from compression orifice 86. FIG. 2 shows spool valve 64 positioned to fully open compression orifice 86 and fully close rebound orifice 94. Thus, a soft compression damping force and a firm rebound damping force are provided. Fluid is free to flow through compression orifice 84, through a bore 126 extending through spool valve 64, through passageway 98 and back to reserve chamber 38 to provide soft compression damping. Fluid is prohibited from flowing through rebound orifice 94 thus providing firm compression damping. FIG. 3 shows spool valve 64 positioned to open both compression orifice 86 and rebound orifice 94. Thus a soft compression damping force and a soft rebound damping force are provided. Fluid is free to flow through both compression orifice 84 and rebound orifice 94 to reserve chamber 38 as described above to provide soft compression and rebound damping. FIG. 4 shows spool valve 64 positioned to fully close compression orifice 86 and fully open rebound orifice 94. Thus, a firm compression damping force and a soft rebound damping force are provided. Fluid is prohibited from flowing through compression orifice 86 to provide firm compression damping. Fluid is free to flow through rebound orifice 94 to reserve chamber 38 as described above to provide soft rebound damping. The amount of firm and/or soft damping provided will be determined by the position of spool valve 64 which in turn is determined by the amount of current being supplied to solenoid coil assembly 60. Preferably, the amount of current to solenoid coil assembly 60 is controlled using pulse width modulation.

Referring now to FIG. 6, the amount of flow through spool valve 64 also contributes to the damping force blowoff level.

By varying the amount of flow through orifice 86 or 94, a variable amount of back pressure is produced to pressure regulated compression main poppet 82. The amount of force or fluid pressure required to displace valve member 110 and move it to its open position is determined by the area deferential of the upstream pressure face versus the downstream pressure face. By continuously varying the pressure on the downstream pressure face through the movement of spool valve 64, the amount of force required to displace valve member 110 can be continuously varied thus resulting in a continuously variable damping force blowoff level. A description of fluid flow during the rebound stroke and the compression stroke is detailed below.

Referring now to FIGS. 1 and 5, during the rebound stroke, check valve 32 in piston 12 is closed preventing fluid flow between upper working chamber 24 and lower working chamber 26. Check valve 34 prohibits fluid flow also due to its setting at a damping force higher than the highest damping force required as described above. Fluid is forced through a passage 130 formed in rod guide 36. The fluid enters upper intermediate chamber 52 which is concentric with working chambers 24 and 26. Fluid exits through rebound outlet 56 and enters rebound inlet 88 of continuously variable servo valve assembly 22 opening shuttle valve 96. After entering rebound inlet 88, fluid flows to rebound main poppet 90, rebound co-poppet 92 and to rebound orifice 94. As described above, the amount of flow through rebound orifice 94 is controlled by the position of spool valve 64 to control the damping characteristics from a soft ride to a firm ride. Fluid flowing through continuously variable servo valve assembly 22 is directed to reserve chamber 38. The rebound movement of piston 12 creates a low pressure within lower working chamber 26. One way check valve 42 in base valve assembly 20 will open to allow fluid flow from reserve chamber 38 to lower working chamber 26.

During the compression stroke, check valve 42 in base assembly 20 is closed preventing fluid flow between lower working chamber 26 and reserve chamber 38. Fluid is forced through a passage 132 formed in base valve assembly 20. The fluid enters lower intermediate chamber 54 which is concentric with working chambers 24 and 26. Fluid exits through compression outlet 58 and enters compression inlet 80 of continuously variable servo valve assembly 22. Fluid being displaced by piston rod 14 during the compression stroke is prevented from entering rebound inlet 88 due to shuttle valve 96. After entering compression inlet 80, fluid flows to compression main poppet 82, compression co-poppet 84 and to compression orifice 86. As described above, the amount of flow through compression orifice 86 is controlled by the position of spool valve 64 to control the damping characteristics from a soft ride to a firm ride. Fluid flowing through continuously variable servo valve assembly 22 is directed to reserve chamber 38. The compression movement of piston 12 creates a low pressure within upper working chamber 24. One-way check valve 32 in piston 12 will open and allow fluid flow between lower working chamber 26 and upper working chamber 24.

The above construction for shock absorber 10 thus provides an infinitely variable solenoid actuated continuously variable shock absorber. Some, but not all of the advantages of this construction are given below. First, shock absorber 10 provides a greater differentiation from soft to firm damping forces in compression due to the introduction of separate compression flow passages and check valves. Second, shock absorber 10 provides for a separately tunable rebound and compression valving. Third, shock absorber 10 provides soft compression damping forces and firm rebound damping forces during the same stroke. Conversely, firm compression damping forces and soft rebound damping forces during the same stroke are also available. Fourth, shock absorber 10 provides a simplified piston valving system. Fifth, shock absorber 10 allows for continuously variable bleed and blow-off features. Sixth, continuously variable servo valve assembly 22 has the ability to differentiate between compression strokes and rebound strokes.

While the above detailed description describes the preferred embodiment of the present invention, it should be understood that the present invention is susceptible to modification, variation and alteration without deviating from the scope and fair meaning of the subjoined claims.

What is claimed is:

1. An adjustable shock absorber comprising:
   a pressure tube defining a working chamber;
   a piston rod extending through said pressure tube and into said working chamber;
   a piston slidably disposed within said pressure tube and connected to said piston rod, said piston defining a plurality of compression fluid passages and a plurality of rebound fluid passages, said piston dividing said working chamber into an upper working chamber and a lower working chamber;
   a compression valve attached to said piston, said compression valve allowing fluid flow from said lower working chamber to said upper working chamber when a first fluid pressure is exerted on said compression valve;
   a rebound valve attached to said piston, said rebound valve allowing fluid flow from said upper working chamber to said lower working chamber when a second fluid pressure is exerted on said rebound valve, the second fluid pressure being greater than the first fluid pressure;
   a reserve tube surrounding said pressure tube, said reserve tube defining a reserve chamber;
   a single valve assembly separate from said piston in direct communication with said upper and lower working chambers and said reserve chamber, said single valve assembly defining a first flow path which includes a first variable orifice for controlling flow from said upper working chamber into said reserve chamber and a second flow path which includes a second variable orifice for controlling flow from said lower working chamber to said reserve chamber;
   said first flow path being the only flow path from said upper working chamber into said reserve chamber.

2. The adjustable shock absorber according to claim 1 wherein, said single valve assembly includes a solenoid valve having means for controlling said first variable orifice.

3. The adjustable shock absorber according to claim 2 wherein, said means for controlling said first variable orifice includes a spool valve.

4. The adjustable shock absorber according to claim 2 wherein, said solenoid valve includes means for controlling said second variable orifice.

5. The adjustable shock absorber according to claim 4 wherein, said means for controlling said first and second orifices include a spool valve.

6. The adjustable shock absorber according to claim 1 wherein, said single valve assembly includes a first poppet valve in communication with said upper working chamber.

7. The adjustable shock absorber according to claim 6 wherein, said single valve assembly includes a second poppet valve in communication with said lower working chamber.

8. The adjustable shock absorber according to claim 6 wherein, said first poppet valve is in communication with said reserve chamber.

9. The adjustable shock absorber according to claim 6 wherein, said single valve assembly includes a solenoid valve having means for controlling said first variable orifice.

10. The adjustable shock absorber according to claim 9 wherein, said means for controlling said first variable orifice includes a spool valve.

11. The adjustable shock absorber according to claim 8 further comprising a base valve assembly disposed between said lower working chamber and said reserve chamber, said base valve assembly controlling fluid flow from said reserve chamber to said lower working chamber, said base valve assembly prohibiting all fluid flow from said lower working chamber to said reserve chamber.

12. The adjustable shock absorber according to claim 6 wherein, said rebound valve is a blowoff valve.

13. The adjustable shock absorber according to claim 12 wherein, said first poppet valve is in communication with said reserve chamber.

14. The adjustable shock absorber according to claim 12 wherein, said single valve assembly includes a solenoid valve having means for controlling said first variable orifice.

15. The adjustable shock absorber according to claim 14 wherein, said means for controlling said first variable orifice includes a spool valve.

16. The adjustable shock absorber according to claim 13 wherein, a base valve assembly disposed between said lower working chamber and said reserve chamber, said base valve assembly controlling fluid flow from said reserve chamber to said lower working chamber, said base valve assembly prohibiting all fluid flow from said lower working chamber to said reserve chamber.

17. The adjustable shock absorber according to claim 1 wherein, said first variable orifice is in communication with said lower working chamber.

18. The adjustable shock absorber according to claim 17 wherein, said second variable orifice is in communication with said upper working chamber.

19. The adjustable shock absorber according to claim 1 wherein, said first and second variable orifices are in communication with said reserve chamber.

20. The adjustable shock absorber according to claim 12 wherein, said first poppet valve is in communication with said lower working chamber and said blowoff valve is in communication with said upper working chamber.

* * * * *